United States Patent Office.

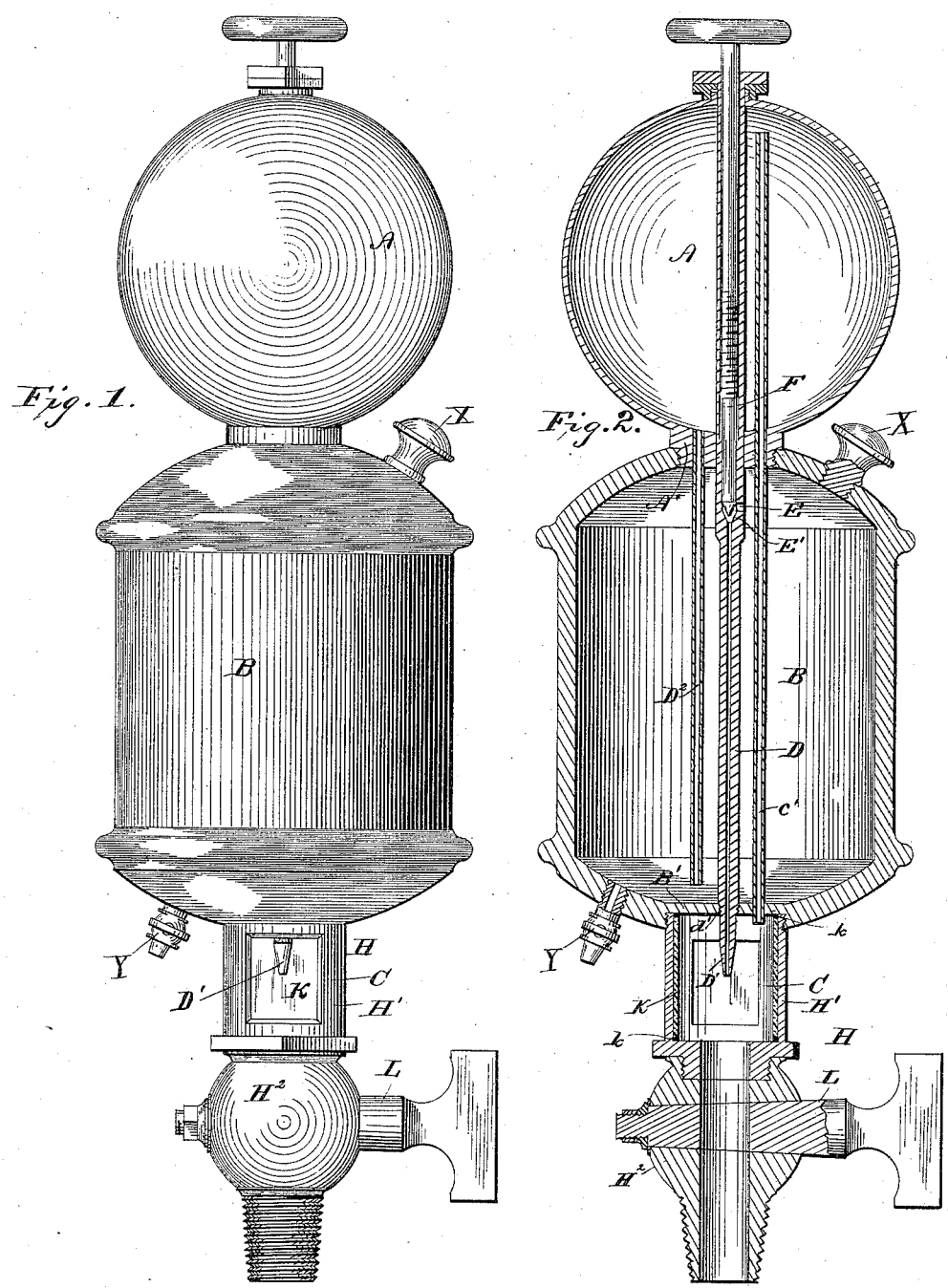

WILLIAM B. BULL, OF QUINCY, ILLINOIS.

LUBRICATOR.

SPECIFICATION forming part of Letters Patent No. 306,382, dated October 14, 1884.

Application filed August 15, 1884. (No model.)

*To all whom it may concern:*

Be it known that I, WILLIAM B. BULL, of Quincy, in the county of Adams and State of Illinois, have invented certain new and useful Improvements in Lubricators; and I do hereby declare the following to be a full, clear, and exact description of the same, reference being had to the accompanying drawings, forming a part of this specification, and to the figures and letters of reference marked thereon.

My invention has for its object to improve the construction of that class of lubricators for steam-engines in which the oil is fed to the part to be lubricated at a rate governed by the amount of steam condensed, which causes the oil in the reservoir to overflow and to be conducted through a suitable observation-chamber, so that the quantity of oil fed can be readily ascertained and regulated; and it consists in certain novel details of construction and combinations of parts, all of which I will now proceed to describe.

In the drawings, Figure 1 represents a side, and Fig. 2 a sectional, view of a lubricator constructed in accordance with my invention.

As shown in Fig. 2, my improved lubricator consists of three principal parts—viz., the condensing-chamber A, the oil-chamber B, and the observation or sight-feed chamber C, separated from each other by the partitions A' and B'. Extending down through the two former and into the latter of these chambers is a hollow stem, D, screw-threaded on its outside at $d'$, co-operating with a similar thread in the partition, so as to make a tight joint between them, and provided on its end with a teat or tapering projection, D'. This stem has a perforation, E, in its side near the top of the oil-chamber, and slightly below said perforation a valve-seat, E', with which the tapered end of the valve F is adapted to co-operate, to close or regulate the passage of oil through the stem when desired. A tube, $D^2$, extends from the bottom of the condensing-chamber A to the bottom of the oil-chamber, through which the water of condensation is conducted to the bottom of the oil-chamber.

Secured to the bottom of the oil-chamber is a fitting, H, provided with the cylindrical portion H', made hollow, and having its sides cut away, as shown, the central portion, $H^2$, being provided with the valve L, and the lower portion screw-threaded for securing the device to the steam-chest or other part of the engine to be lubricated.

As before stated, the sides of the tubular portion H of the casing are cut away, as shown, and within it is a piece of glass tubing, K, provided at its ends with suitable steam-tight packing, $k$, as shown; or, instead of the glass tubing, the part H may be T-shaped and plain disks of glass inserted in the two opposite sides, as will be readily understood.

Extending from the observation-chamber C through the oil-chamber to the upper end of the condensing-chamber is a tube, $c'$, for conveying the steam to the latter. It will also be noticed that the steam-pipe $c'$, passing through the oil-chamber, keeps the oil hot at all times.

The oil-chamber B is provided with a filling-orifice at its upper end, closed by a plug, X, and also at its lower end with a cock, Y, for drawing off the water from the oil-chamber when desired, or for blowing out the sediment which might collect there.

The operation is as follows: The valve or cock L is closed, the chamber filled with oil through the orifice in its top, which is then closed by plug $x$, the cock L opened, and the steam passing up through the tube I to the chamber A is condensed, and the water of condensation drops through the tube $D^2$ to the bottom of the oil-reservoir, displacing a portion of the oil and causing it to pass through the orifice E in the stem D downward, and to drop off the end or teat D' into the fitting, from whence it is delivered to the cylinder or other part to be lubricated. The oil dropping through the fitting can be readily seen through the glass K, and thus the operator can tell whether oil is being fed, and in what quantity, and can easily regulate the same by means of the valve F, as described. When it is desired to refill the oil-chamber, the steam is shut off by means of the valve L, and the water of condensation drawn off from the chamber by the cock Y, and when the chamber is free of water it is refilled and the operation repeated, as before.

I claim as my invention—

1. In a lubricator, the combination of the condensing-chamber, the oil-chamber, and the observation-chamber, the latter connected directly to the steam-supply, with a tube leading from said observation-chamber to the condensing-chamber, a second tube leading from the condensing-chamber to the oil-chamber, and an oil-duct leading from the upper part of the oil-chamber into the observation-chamber and steam-supply, substantially as described.

2. The combination, with the condensing and oil chambers, communicating as described, of the hollow stem D, provided with the teat at its lower end and the valve F, substantially as described.

3. The combination, with the condensing and oil chambers and the hollow stem provided with the teat and valve, of the glass observation-chamber, into which the end of the hollow stem projects, substantially as described.

4. The combination, with the condensing and oil chambers and their connections, as described, of the fitting provided with the observation-chamber and valve, and supporting the entire device, substantially as described.

5. The combination, with the condensing and oil chambers, of the tube extending from the steam-supply to the condensing-chamber, passing through the oil-chamber and heating the oil therein, the tube connecting the condensing-chamber and the oil-chamber, and the hollow stem provided with the teat, as shown, for conveying the oil from the top of the oil-chamber, and the fitting provided with the glass, and valve, as shown, whereby the oil is fed down through the stem and drops off the teat in visible drops, substantially as described.

WILLIAM B. BULL.

Witnesses:
LYMAN A. WILEY,
FRANK P. EULL.